US012646981B2

(12) United States Patent
Hoang et al.

(10) Patent No.:  US 12,646,981 B2
(45) Date of Patent:      Jun. 2, 2026

(54) ELECTRIC MOTOR STATOR WITH ENHANCED GEOMETRIC FEATURES FOR HIGH VOLTAGE USE

(71) Applicant: Parker-Hannifin Corporation, Cleveland, OH (US)

(72) Inventors: Hai N. Hoang, North Mankato, MN (US); Charles E. Kodet, North Mankato, MN (US); Steven R. Huard, New Ulm, MN (US); Joseph L. Dobmeier, Mankato, MN (US); John W. Froeb, Charlotte, NC (US); Jeff Nazzaro, Waconia, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 239 days.

(21) Appl. No.: 18/635,611

(22) Filed: Apr. 15, 2024

(65) Prior Publication Data

US 2025/0015646 A1      Jan. 9, 2025

Related U.S. Application Data

(60) Provisional application No. 63/511,703, filed on Jul. 3, 2023, provisional application No. 63/620,197, filed on Jan. 12, 2024.

(51) Int. Cl.
*H02K 3/28*          (2006.01)
*H02K 1/16*          (2006.01)
*H02K 15/33*        (2025.01)
(52) U.S. Cl.
CPC .............. *H02K 1/165* (2013.01); *H02K 3/28* (2013.01); *H02K 15/33* (2025.01)

(58) Field of Classification Search
CPC ........... H02K 1/165; H02K 15/33; H02K 3/28
See application file for complete search history.

(56) References Cited

U.S. PATENT DOCUMENTS

| | | | |
|---|---|---|---|
| 12,294,270 B2 * | 5/2025 | Amano ................. | H02K 3/522 |
| 2018/0287447 A1 * | 10/2018 | Kitamura ............. | H02K 15/022 |
| 2023/0013487 A1 | 1/2023 | Grimm et al. | |
| 2023/0085682 A1 * | 3/2023 | Amano ................. | H02K 21/16 |
| | | | 310/71 |

FOREIGN PATENT DOCUMENTS

| | | |
|---|---|---|
| EP | 3 598 612 B1 | 1/2021 |
| KR | 2022002337 A | 3/2022 |
| WO | 2021/140715 A1 | 7/2021 |
| WO | 2021/240849 A1 | 12/2021 |

* cited by examiner

*Primary Examiner* — Terrance L Kenerly
(74) *Attorney, Agent, or Firm* — McDonnell Boehnen Hulbert & Berghoff LLP

(57) ABSTRACT

An example stator includes a stator body that is generally cylindrical; and a plurality of posts that protrude axially from the stator body and are arranged in a circular array about a perimeter of the stator body. Each post of the plurality of posts may include: a first slot, a second slot that is disposed radially-outward from the first slot, and a partition wall that separates the first slot from the second slot. Respective first slots are aligned circularly to form an inward circular channel about an outer peripheral surface of the stator body, and respective second slots are aligned circularly to form an outward circular channel about the outer peripheral surface of the stator body, wherein the outward circular channel is insulated from the inward circular channel via respective partition walls of the plurality of posts.

20 Claims, 11 Drawing Sheets

700

700

900

PROVIDING A STATOR BODY OF STATOR OF AN ELECTRIC MOTOR, WHEREIN THE STATOR BODY IS GENERALLY CYLINDRICAL

902

FORMING A PLURALITY OF POSTS IN A CIRCULAR ARRAY ABOUT A PERIMETER OF THE STATOR BODY SUCH THAT THE PLURALITY OF POSTS PROTRUDE AXIALLY FROM THE STATOR BODY, WHEREIN A POST OF THE PLURALITY OF POSTS INCLUDES: (I) A FIRST SLOT, (II) A SECOND SLOT THAT IS DISPOSED OUTWARD FROM THE FIRST SLOT, AND (III) A PARTITION WALL THAT SEPARATES THE FIRST SLOT FROM THE SECOND SLOT, WHEREIN RESPECTIVE FIRST SLOTS OF THE PLURALITY OF POSTS ARE ALIGNED CIRCULARLY TO FORM AN INWARD CIRCULAR CHANNEL ABOUT AN OUTER PERIPHERAL SURFACE OF THE STATOR BODY, WHEREIN RESPECTIVE SECOND SLOTS OF THE PLURALITY OF POSTS OF THE STATOR BODY ARE ALIGNED CIRCULARLY TO FORM AN OUTWARD CIRCULAR CHANNEL ABOUT THE OUTER PERIPHERAL SURFACE OF THE STATOR BODY, SUCH THAT THE OUTWARD CIRCULAR CHANNEL IS SHIFTED OUTWARD FROM AND IS PARALLEL TO THE INWARD CIRCULAR CHANNEL, WHEREIN THE OUTWARD CIRCULAR CHANNEL IS INSULATED FROM THE INWARD CIRCULAR CHANNEL VIA RESPECTIVE PARTITION WALLS OF THE PLURALITY OF POSTS

904

ROUTING THREE JUMPER WIRES THROUGH THE OUTWARD CIRCULAR CHANNEL AND THE INWARD CIRCULAR CHANNEL SUCH THAT EACH JUMPER WIRE OF THE THREE JUMPER WIRES TRAVERSES AT LEAST A PORTION OF THE OUTWARD CIRCULAR CHANNEL OR THE INWARD CIRCULAR CHANNEL WITHOUT CONTACTING ANY OTHER JUMPER WIRE

ELECTRIC MOTOR STATOR WITH ENHANCED GEOMETRIC FEATURES FOR HIGH VOLTAGE USE

CROSS REFERENCE TO RELATED APPLICATION

The present application claims priority to U.S. Provisional Application No. 63/511,703 filed on Jul. 3, 2023 and U.S. Provisional Application No. 63/620,197 filed on Jan. 12, 2024, the entire contents of all of which are herein incorporated by reference as if fully set forth in this description.

BACKGROUND

An example electric motor can include a stator and a rotor mounted within the stator. The stator can have plurality of wire windings.

FIG. 1 illustrates a perspective view of a stator 10 having a plurality of wire windings such as wire winding 12. Wire windings can also be referred to as wire bundles, magnet wires, or coils. Individual wires of each wire winding may touch each other, and therefore they are typically insulated from each other to prevent short circuiting.

Particularly, individual wires of a wire winding are typically copper wires that have enamel thereon or any other thin insulation material to electrically insulate the wires from each to prevent short circuits and protect the electric motor. The stator 10 and the electric motor operate normally as long as such insulation material remains intact.

Each wire of a wire winding may be subjected to a fraction of the voltage of the electric motor as a whole because the voltage is divided between the wire windings. Further, voltage level or potential may vary between respective wires of a wire winding, and may also vary between the beginning and the end of a wire winding.

As an example for illustration, one wire of a wire winding may be at a 600 volts potential, while another neighboring wire may be at 601 volts potential. An example wire winding may have a 100 volts potential at one end, and 200 volts potential at the other end. Thus, the potential differential between two wires of a given wire winding could be 100 volts in this example. Insulation between the wires thus prevents short circuiting as the wires contact each other while having different voltage.

Further, a neighboring wire winding or bundle may be subjected to a different voltage level. For example, an adjacent wire winding may have 900 volts at one end and a 1000 volts at the other end. As such, voltage differential between neighboring wire windings could be large (e.g., 500 volts, 700 volts, etc.) depending on where they are located in the stator 10. Therefore, stators such as the stator 10 may have slots between the wire windings, and the slots are insulated to insulate the wire windings from each other.

The stator 10 further has jumper wires (e.g., short lengths wires made of copper or aluminum) that connect different sections or coils of the wire windings. These jumper wires help create the desired electrical connections and facilitate the flow of current through the wire windings.

The wire windings of the stator 10 can be arranged in specific patterns to generate desired magnetic fields for motor operation. The jumper wires are used to connect the different sections of the wire windings together in a structured manner. The configuration and arrangement of the jumper wires can vary depending on the motor design, number of phases, and winding type. The jumper wires may be used to connect wire windings in series or parallel, depending on the desired electrical characteristics of the electric motor. The jumper wires are then routed away from the stator 10 in a jumper cable 14 that can have three wires, for example.

Individual wires of the jumper cable 14 can be at different voltage levels as they have the largest and lowest voltages of the stator 10. For example, two wires of the jumper cable 14 may have a 1000 volts differential. Due to such large differential, the jumper wires (that are connected to the wire windings of the stator 10) of the jumper cable 14 are insulated from each other.

As such, the stator 10 may have additional insulation 16 that covers and insulates the jumper wires to protect them from each other and from the wire windings. Typically, the insulation 16 is manually wound and tied down to the wire windings, which involves substantial manual labor. Such manual labor may reduce manufacturing efficiency, increase cost, and reduce reliability. It may thus be desirable to configure a stator in a manner that isolates the jumper wires while facilitating automatic winding and routing of the jumper wires without having to add insulation manually. It is with respect to these and other considerations that the disclosure made herein is presented.

SUMMARY

The present disclosure describes implementations that relate to an electric motor stator with enhanced geometric features for high voltage use.

In a first example implementation, the present disclosure describes a stator of an electric motor. The stator includes: a stator body that is generally cylindrical; and a plurality of posts that protrude axially from the stator body and are arranged in a circular array about a perimeter of the stator body. A post of the plurality of posts includes: a first slot, a second slot that is disposed outward from the first slot, and a partition wall that separates the first slot from the second slot. Respective first slots of the plurality of posts are aligned circularly to form an inward circular channel about an outer peripheral surface of the stator body, wherein respective second slots of the plurality of posts of the stator body are aligned circularly to form an outward circular channel about the outer peripheral surface of the stator body, such that the outward circular channel is shifted outward from and is parallel to the inward circular channel, wherein the outward circular channel is insulated from the inward circular channel via respective partition walls of the plurality of posts. The outward circular channel and the inward circular channel accommodate three jumper wires such that each jumper wire of the three jumper wires traverses at least a portion of the outward circular channel or the inward circular channel without contacting any other jumper wire.

In a second example implementation, the present disclosure describes an electric motor including the stator of the first example implementation.

In a third example implementation, the present disclosure describes a method of making, forming, or assembling the stator of the first example implementation.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

FIG. 11 is a flowchart of a method of making a stator of an electric motor, according to an example implementation.

DETAILED DESCRIPTION

Disclosed herein is a stator with enhanced geometric features that facilitate routing jumper wires while insulating them from each other without having to add insulation manually. Within examples, other features disclosed herein enhance the manufacturing efficiency and reduce manufacturing cost of the stator.

Figure 1:
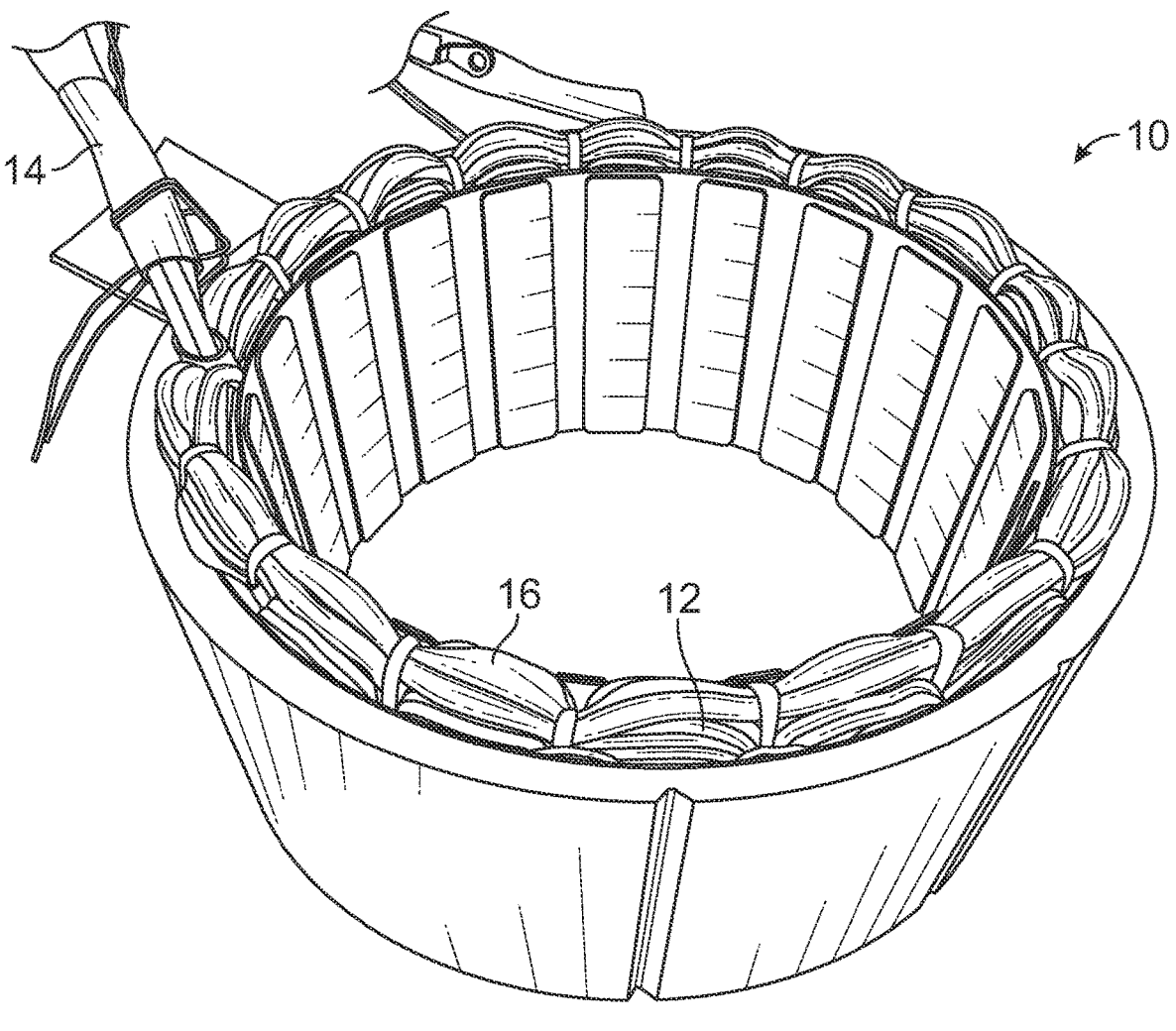
FIG. 1 illustrates a perspective view of a stator having a plurality of wire windings, jumper wires, and insulation.
Figure 2A:
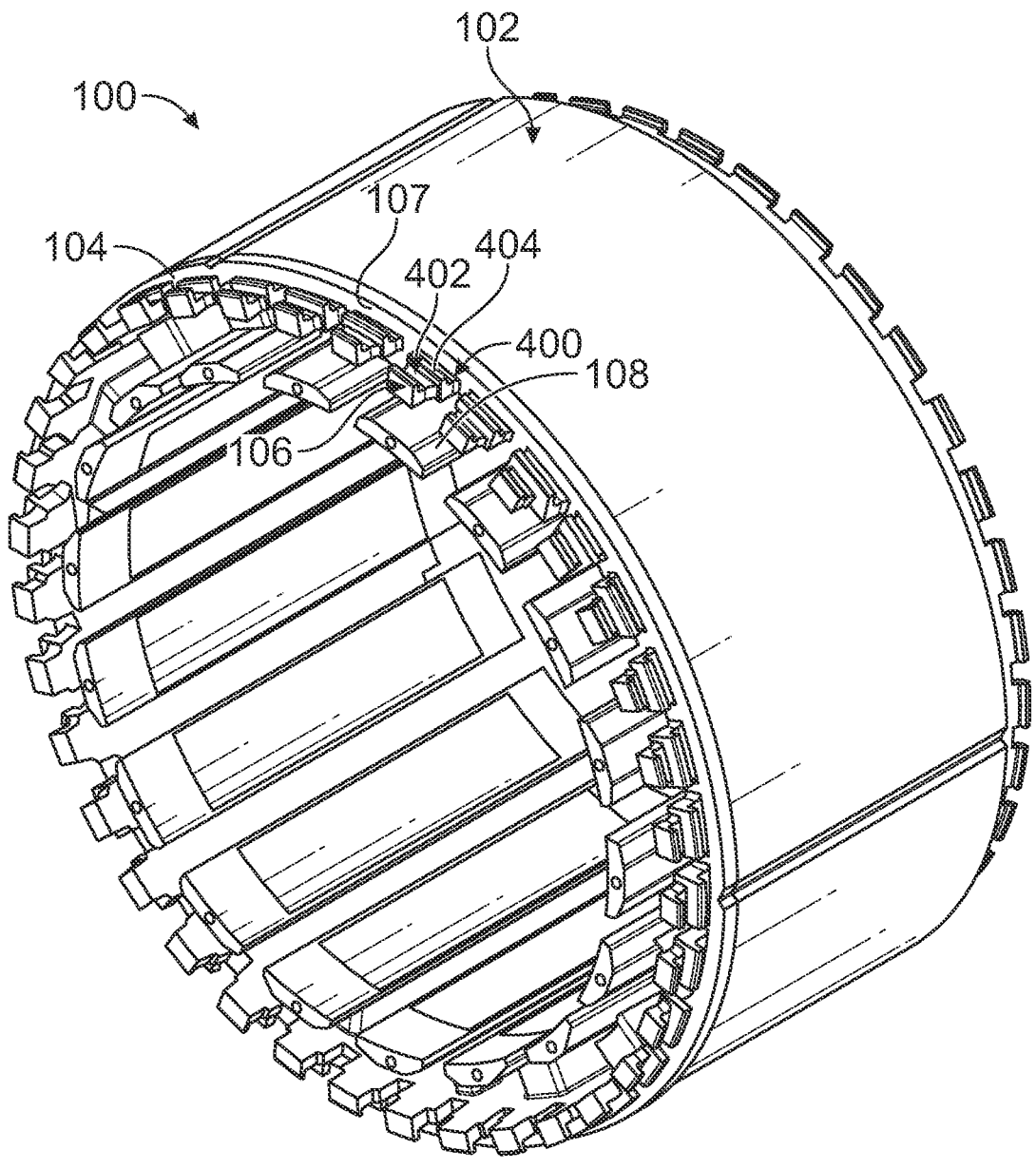
FIG. 2A illustrates a perspective view of a stator, according to an example implementation.
Figure 2B:
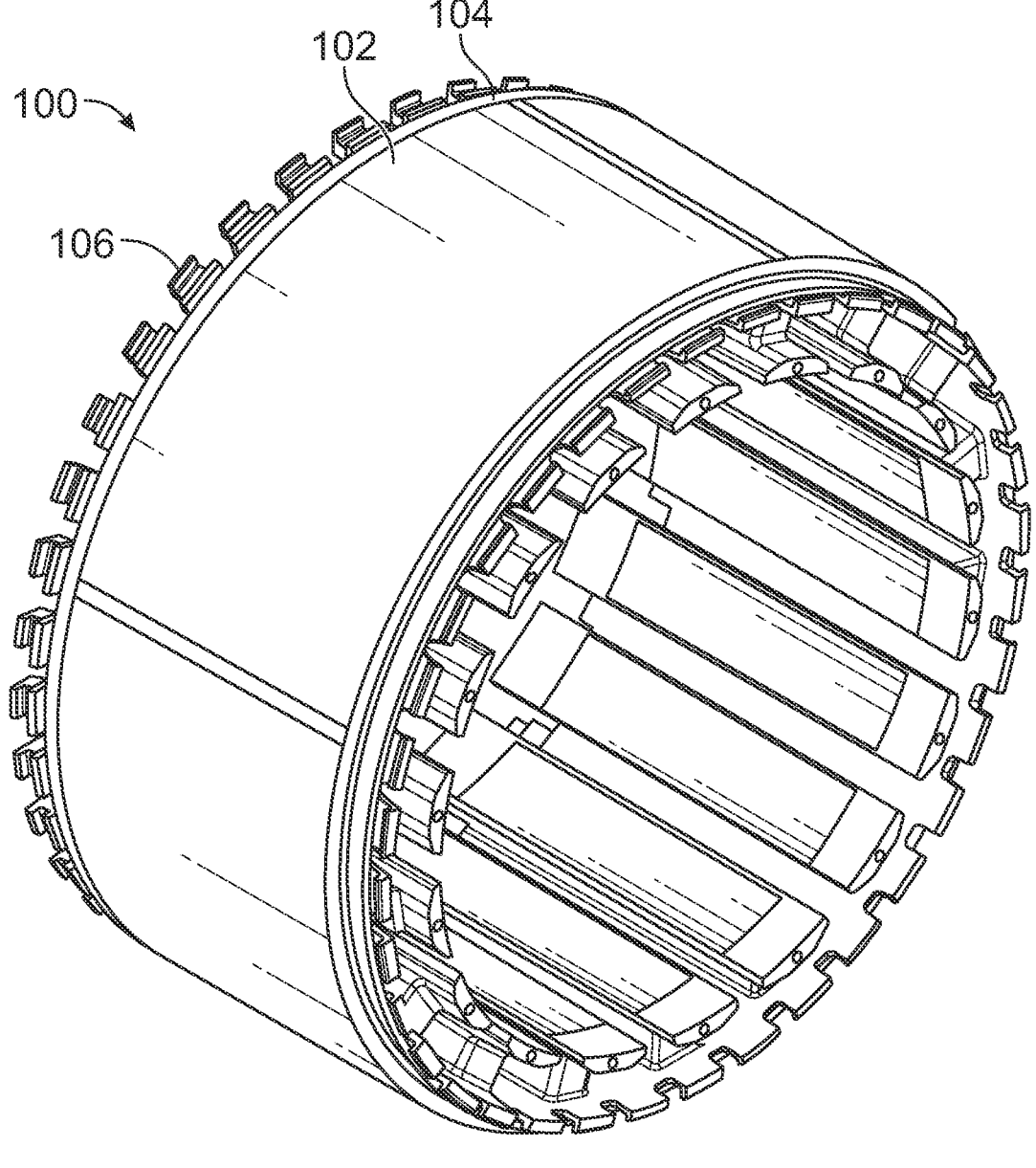
FIG. 2B illustrates another perspective view of the stator of FIG. 2A, according to an example implementation.
Figure 3:
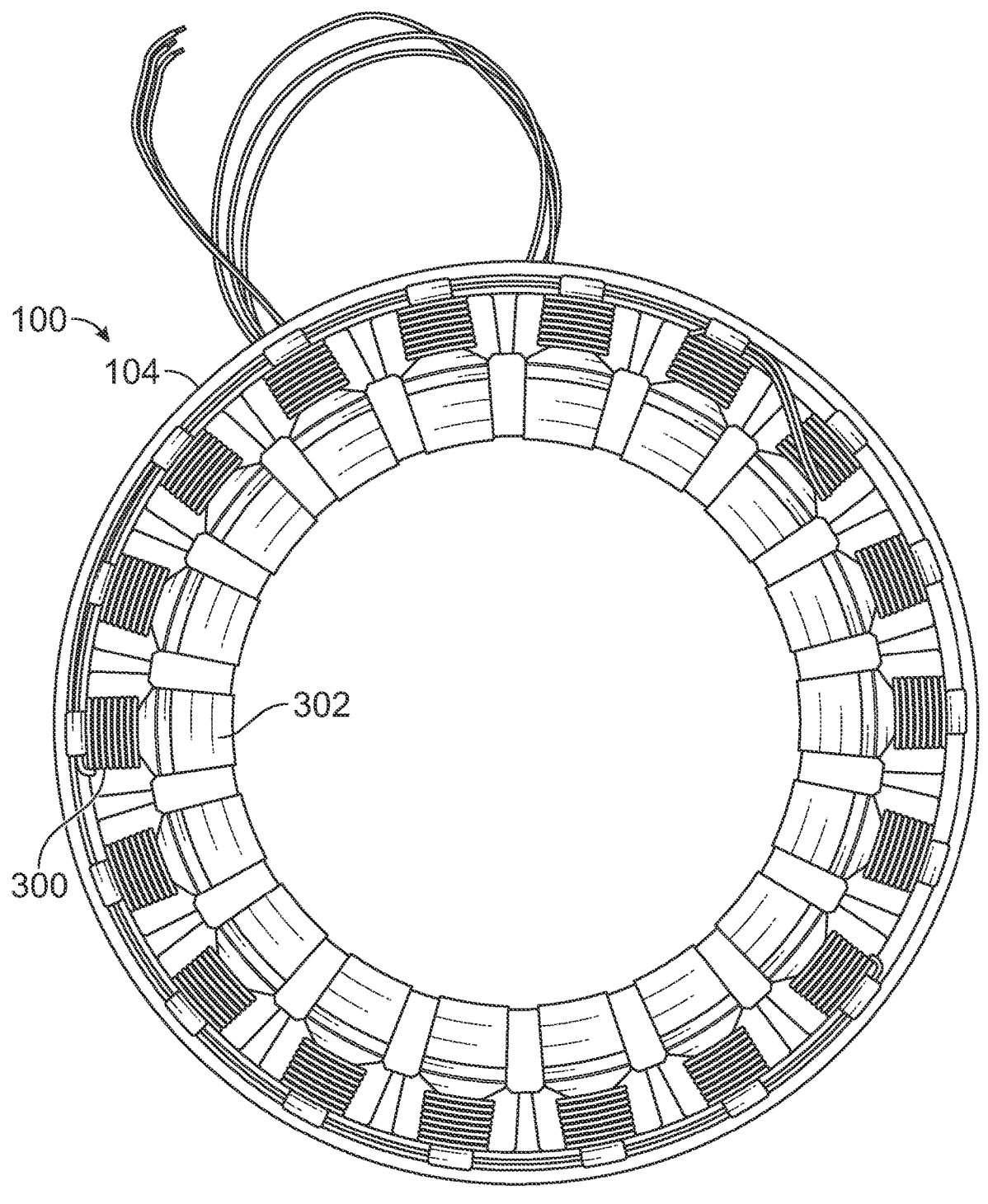
FIG. 3 illustrates the stator of FIGS. 2A-2B with wire windings wrapped thereabout, according to an example implementation.

FIG. 2A illustrates a perspective view of a stator 100, and FIG. 2B illustrates another perspective view of the stator 100, according to an example implementation. FIG. 3 illustrates the stator 100 of FIGS. 2A-2B with wire windings wrapped thereabout, according to an example implementation.

Referring to FIGS. 2A-2B, the stator 100 is configured to be positioned within a housing of an electric motor. The stator 100 comprises at least one lamination stack 102, and includes a plurality of coils or wire windings such as wire winding 300 shown in FIG. 3, wrapped about slots formed in the lamination stack 102 and formed between poles, such as pole 302, of the stator 100.

The lamination stack 102 forms a stator body 104 that is generally cylindrical in shape. The stator body 104 has a plurality of posts, such as post 106, that protrude axially from the stator body 104 and are arranged in a circular array about a perimeter or end face 107 (a circular end face or edge) of the stator body 104.

Further, as shown in FIG. 2A, the stator 100 further includes a plurality of bobbin flanges, such as bobbin flange 108, disposed underneath the plurality of posts. These bobbin flanges can be considered as part of the poles (e.g., the pole 302 in FIG. 3) of the stator 100, and they structurally support the wire windings of the stator 100 and prevent them from "falling off" as shown in FIG. 3.

Figure 4:
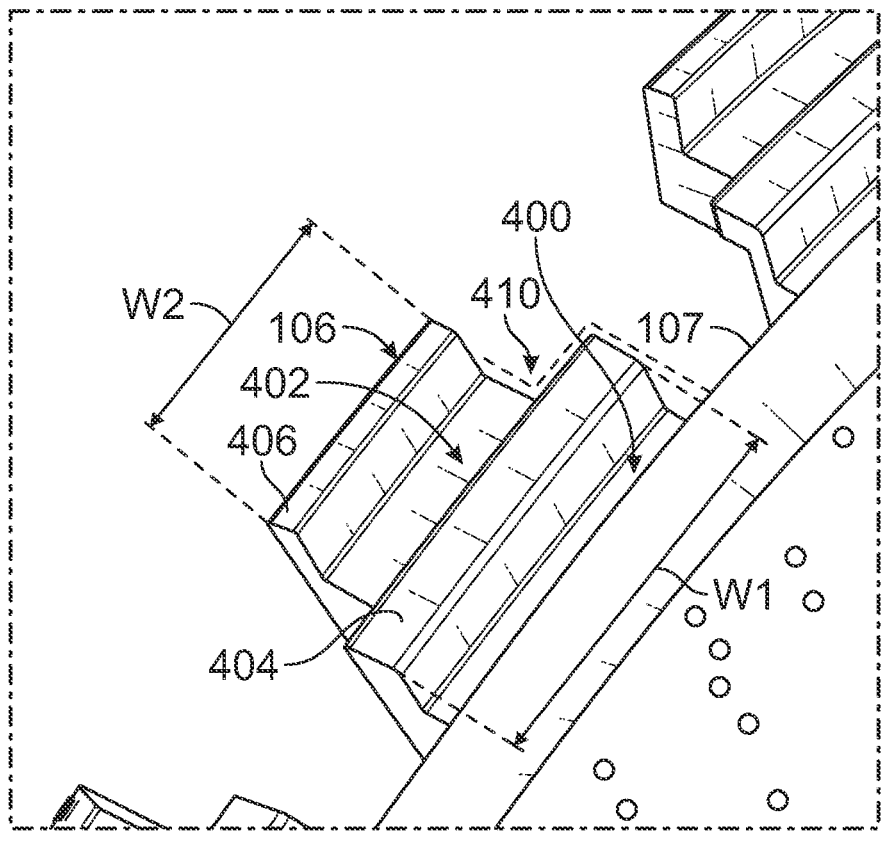
FIG. 4 illustrates an enlarged view of a post of a stator body of the stator of FIGS. 2A-2B, according to an example implementation.

FIG. 4 illustrates an enlarged view of the post 106 of the stator body 104, according to an example implementation. The post 106 can also be referred to as a "trey" or jumper wire insulators/isolators.

The post 106 includes a first groove or first slot 400 and a second groove or second slot 402. The first slot 400 is disposed inward from the second slot 402 (or the second slot 402 is disposed outward from the first slot 400) relative to the end face 107 of the stator body 104. The terms "inward" and "outward" indicate positioning of the slots 400, 402 relative to the end face 107 of the stator body 104.

As depicted, the second slot 402 is parallel to the first slot 400. Further, the second slot 402 is separated or isolated from the first slot 400 via a partition wall 404. The post 106 further includes a distal wall 406 that defines the second slot 402. With this configuration, the first slot 400 is formed between the end face 107 of the stator body 104 and the partition wall 404, while the second slot 402 is formed or interposed between the distal wall 406 and the partition wall 404.

Notably, a width "W1" of the partition wall 404 or the first slot 400 of the post 106 is greater than a respective width "W2" of the distal wall 406 or the second slot 402. In other words, the arcuate length or angular span of the first slot 400 is larger than a respective arcuate length or angular span of the second slot 402. With this configuration, a step 410 (a lateral step) is formed at a transition from the first slot 400 (or from the partition wall 404) to the second slot 402. As described in more detail below, the step 410 may facilitate routing jumper wires of the stator 100 in an efficient manner.

Referring back to FIGS. 2A-2B, the respective first slots (i.e., inward slots such as the first slot 400) of the plurality of posts of the stator body 104 are aligned circularly to form an inward circular channel about a circumference or outer peripheral surface of the stator body 104. Similarly, the respective second slots (i.e., outward slots such as the second slot 402) of the plurality of posts of the stator body 104 are aligned circularly to form an outward circular channel about the circumference or outer peripheral surface of the stator body 104. The circular channels can also be referred to as circumferential grooves.

The outward circular channel is shifted radially outward from, and is parallel to, the inward circular channel. Further, the outward circular channel is isolated or insulated from the inward circular channel via the respective partition walls (e.g., the partition wall 404) of the posts.

With this configuration, the outward circular channel and the inner circular channel form tracks that are insulated from each. Jumper wires of the stator 100 can then be positioned (e.g., via a winding machine in an automated way rather than manually) in the circular channels such that the jumper wires are separated and insulated from reach other.

Figure 5:
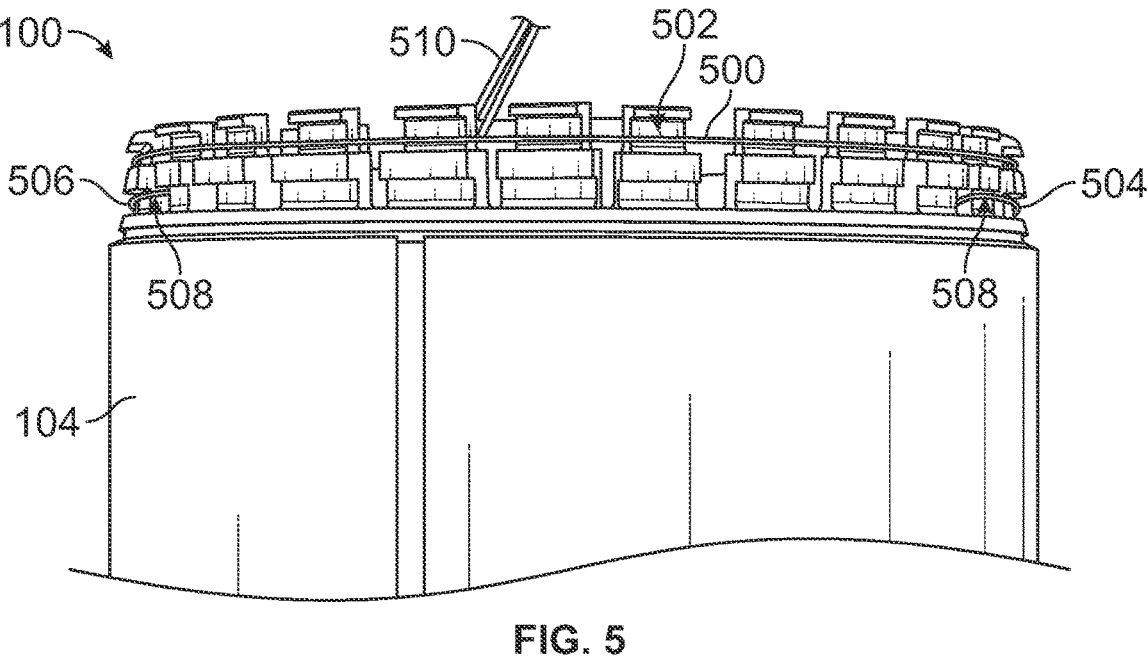
FIG. 5 a top view of the stator of FIGS. 2A-2B with three jumper wires routed through the circular channels of the stator, according to an example implementation.

FIG. 5 illustrates a top view of the stator 100 with three jumper wires routed through the circular channels of the stator 100, according to an example implementation. As shown in FIG. 5, the stator 100 may include a first jumper wire 500 that is disposed in an outward circular channel 502 formed by the respective second slots of the respective posts of the stator 100. The stator 100 furthers includes a second jumper wire 504 and a third jumper wire 506, both of which are disposed in or routed through an inward circular channel 508 formed by the respective first slots of the respective posts.

As described above, jumper wires, such as the jumper wires 500, 504, 506, are used to connect the different sections of the wire windings of the stator 100 together in a structured manner. The configuration and arrangement of the jumper wires 500, 504, 506 can vary depending on the motor design, number of phases, and winding type. The jumper wires 500, 504, 506 may be used to connect wire windings in series or parallel, depending on the desired electrical characteristics of the electric motor. The jumper wires 500, 504, 506 are then routed away from the stator 100 in a jumper cable 510.

In an example, the stator 100 can include a connector (e.g., a multi-pin connector socket) mounted or integrated with at least one of the posts, such as the post 106. The jumper wires 500, 504, 506 or wires of the jumper cable 510 can be connected to the pins of such connector. A connector plug to which power wires are connected can then be plugged into the connector mounted to the post to provide power to the windings of the stator 100. This configuration may enhance reliability as it avoids routing the jumper cable 510 between components of motor to an external connector, for example.

As depicted in FIG. 5, as the jumper wires 500, 504, 506 traverse the circular channels, they do not come into contact with each other and are insulated from each other due to the construction of the posts and the parallel configuration of the circular channels. The first jumper wire 500 is separated and insulated from the second jumper wire 504 and the third jumper wire 506 via the respective partition walls of the posts.

Further, although the second jumper wire 504 and the third jumper wire 506 are both disposed in the inward circular channel 508, they do not contact each other. Particularly, the second jumper wire 504 and the third jumper wire 506 do not have the same angular span of the circumference of the stator 100. As an example for illustration, the second jumper wire 504 can be disposed along a first angular span (e.g., a given quadrant), while the third jumper wire 506 is disposed along a second angular span, different from the first angular span (e.g., different quadrant) such that the second jumper wire 504 and the third jumper wire 506 do not overlap when they are in the same circular channel (the inward circular channel 508 in this case).

Thus, two circular channels (the outward circular channel 502 and the inward circular channel 508) accommodate three jumper wires (the jumper wires 500, 506, 506). This is accomplished by allowing one or more of the jumper wires 500, 506, 506 to be routed underneath the posts (e.g., lower level) then switched to an upper level through the outward circular channel 502 or the inward circular channel 508. The term "lower level" herein refers to space underneath the posts, between a center of the stator body 104 and the bottom surfaces of the posts. On the other hand, the term "upper level" herein refers to where the outward circular channel 502 and the inward circular channel 508 are formed in the posts (opposite from the bottom surfaces of the posts).

Figure 6:
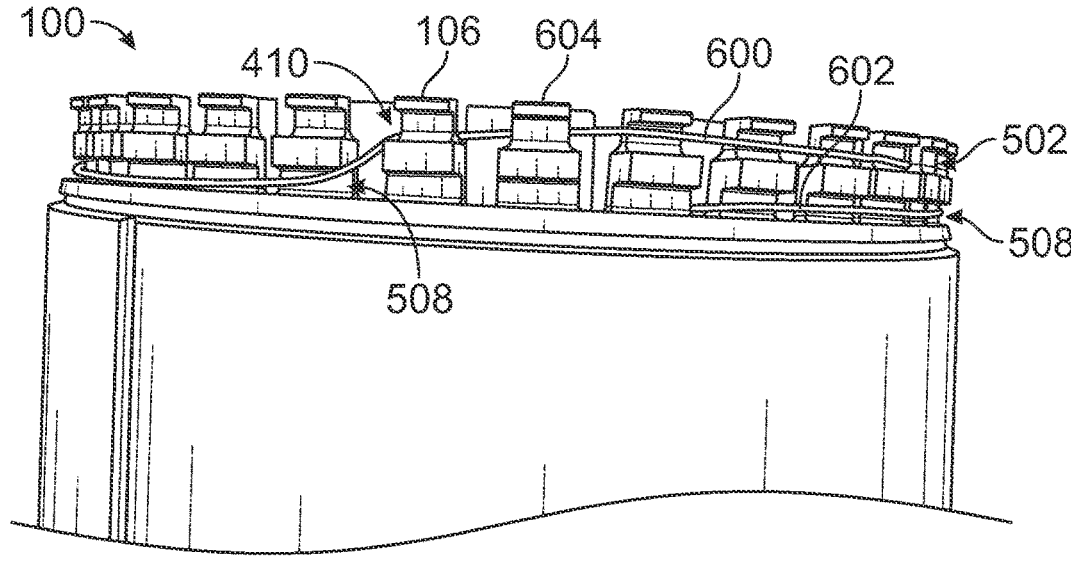
FIG. 6 illustrates a top view of the stator of FIGS. 2A-2B showing transition of a jumper wire from a lower level to an upper level, while avoiding contact with another jumper wire, according to an example implementation.

FIG. 6 illustrates a top view of the stator 100 showing transition of a jumper wire 600 from a lower level to an upper level, while avoiding contact with another jumper wire 602, according to an example implementation. The jumper wires 600, 602 represent any pair of the jumper wires 500, 504, 506 described above with respect to FIG. 5, for example.

As shown, the jumper wire 600 is routed through the outward circular channel 502, then routed underneath post 604 and the post 106, then transitioned to the upper level to be disposed through the inward circular channel 508. As shown, the step 410 creates room or a landing spot for the jumper wire 600 to enter the upper level (e.g., the inward circular channel 508). Without the step 410, the jumper wire 600 might slip to the lower level when automatically winding the jumper wire 600 around the stator 100.

Thus, as illustrated in FIG. 6, the jumper wire 600 and jumper wire 602 overlap when they are disposed in two separate circular channels, e.g., when the jumper wire 600 is in the outward circular channel 502, while the jumper wire 602 is in the inward circular channel 508 (right portion of FIG. 6). However, to route both the jumper wires 600, 602 through the same circular channel (the inward circular channel 508 in this case), the jumper wire 600 is first routed underneath one or more of the posts, then upward to be routed through the same circular channel in which the jumper wire 602 is disposed. In other words, the jumper wire 600 is twisted around the post 106.

This way, the jumper wire 600 and the jumper wire 602 do not overlap when routed through the same circular channel. In other words, the jumper wire 600 can bypass the jumper wire 602 without making contact therewith, and this is facilitated by the step 410. Particularly, the step 410 can help maintain separation of two jumper wires when proximate to each other by facilitating changing the level (e.g., from the lower level underneath the posts to the upper level where the circular channels are formed) of a jumper wire. This is particularly advantageous when the jumper wires are routed automatically via a winding machine as the machine can maintain possession of the jumper wire while routing it from one level to the other across or through the step 410.

As such, two circular channels (the outward circular channel 502 and the inward circular channel 508) can accommodate more than two jumper wires (e.g., can accommodate three jumper wires), while maintaining the jumper wires insulated from each other. Thus, there is no need to add insulation manually. The configuration of the stator 100 thus facilitates using an automated process to position the jumper wires in the circular channels without manual processes.

Further, the posts can be configured such that the stator 100 meets standard creepage and clearance requirements for high voltage use applications. Creepage refers to the shortest distance between two wires at different potentials, where the wires are placed along the same surface. Clearance refers to the shortest distance in the air between two wires. The posts, such as the post 106, can be configured such that the creepage and clearance (e.g., distances between two wires traversing the circular channels) meets any particular requirement (e.g., requirements associated with insulating 1000 volts potential differential).

Further, the configuration of the stator 100 having the posts described above enables the jumper wires to be apart from each other (instead of contacting or being close to each other), thereby increasing the partial discharge inception voltage. Partial discharge inception voltage refers to the lowest voltage at which partial discharges occur between two conducing wires when the voltage is gradually increased from a lower value. By separating the jumper wires via the structure of the posts, the partial discharge inception voltage can be advantageously increased.

In examples, the posts (e.g., the post 106, 604) can be made of a plastic material such that the posts can be injection molded during manufacturing the stator 100. In an injection molding example process, core pulls (also known as slides) are mechanical devices used to create intricate shapes or undercuts (such as the slots of the posts) in molded parts. The core pulls can include hydraulic cylinders, pistons, and associated control systems that facilitate the controlled movement of mold components during the injection molding process. The core pulls work by using hydraulic pressure to move specific mold components, such as slides or cores, in a controlled manner. By actuating the hydraulic cylinders, the pulls move in the direction opposite to that of the mold opening, thereby releasing the molded part with undercuts/slots/grooves, for example. This allows the part to be ejected, without any damage to its intricate features.

In an example, the posts shown in FIGS. 2A-2B and 4-6 can be created using 6 pulls from different sides to make the slots in the posts. It may be desirable in some cases to have a smaller number of pulls (e.g., 4 pulls) to have a more efficient manufacturing process. In such case, the slots can be made with four side actions (e.g., in the four quadrants). For example, when the mold opens up, the pulls can be withdrawn in the four quadrants to create the slots and eject the part.

The shape of the posts can be adjusted to facilitate forming the posts using the more efficient manufacturing process. For example, rather than having the posts, such as the posts 106, 604, configured with symmetric distal walls (e.g., the distal wall 406 having a rectangular end face), the posts can be made to be asymmetric.

Figure 7:
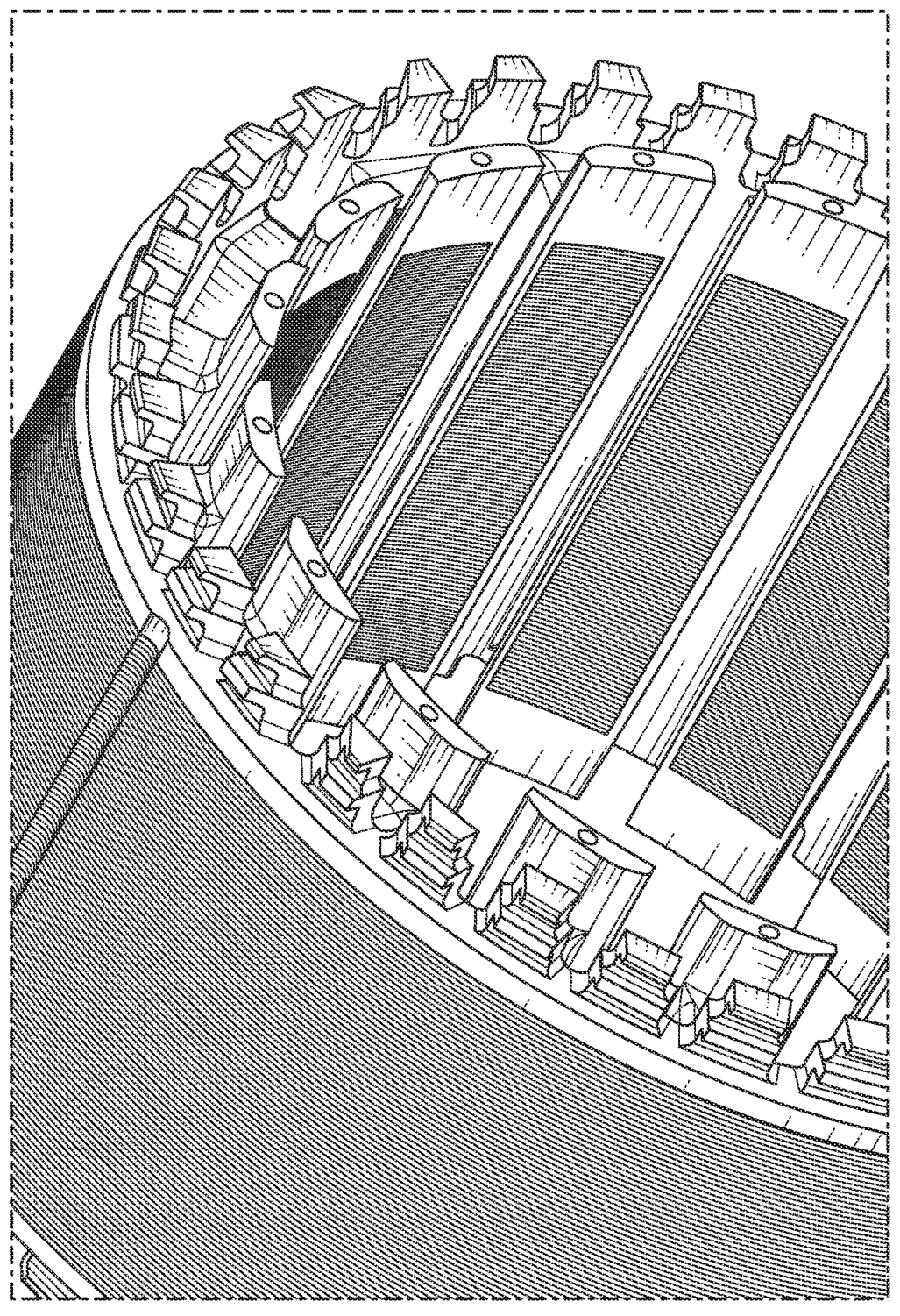
FIG. 7 illustrates a perspective view of a stator with asymmetric posts, according to an example implementation.
Figure 8:
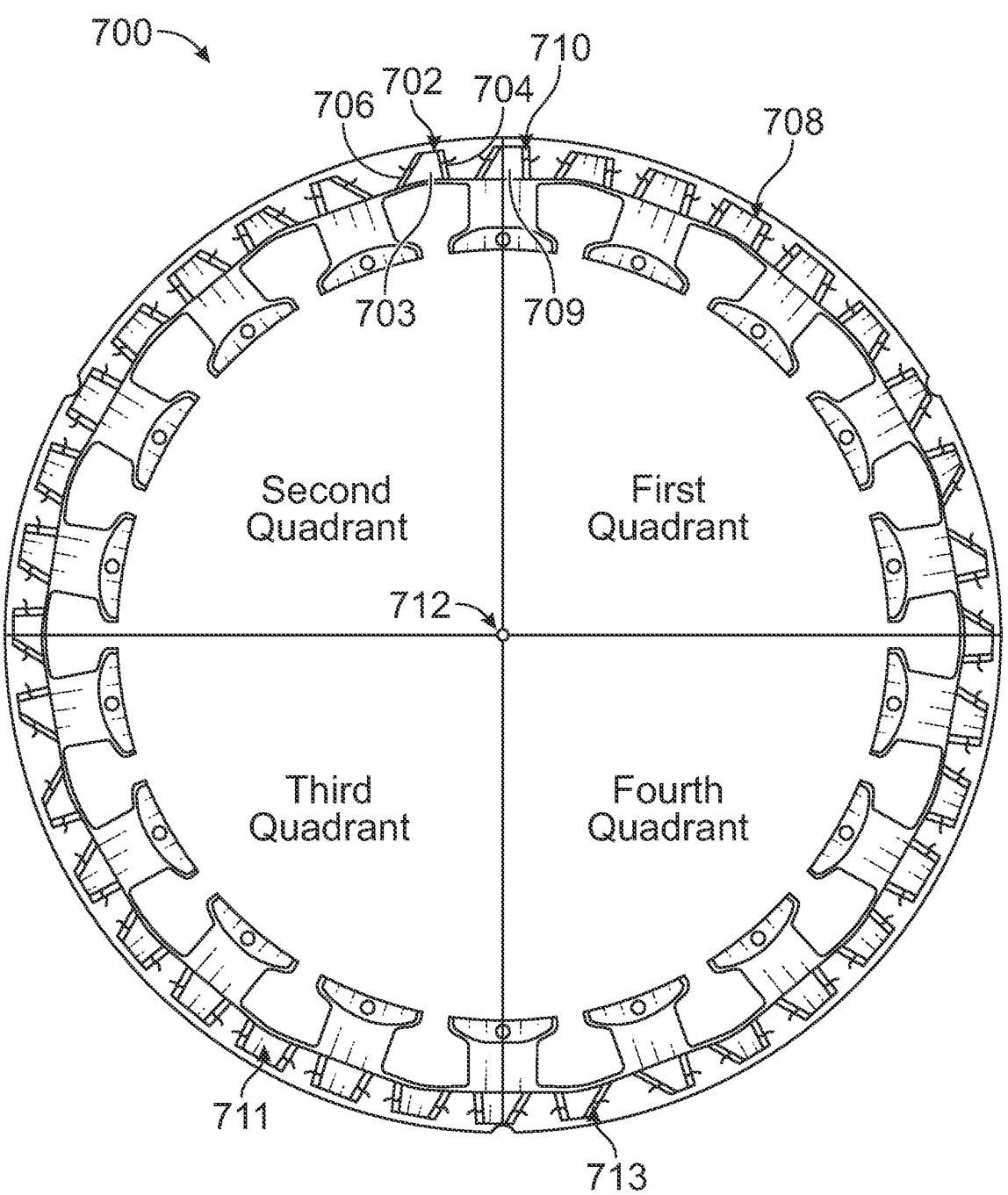
FIG. 8 illustrates a front view of the stator of FIG. 7, according to an example implementation.
Figure 9:
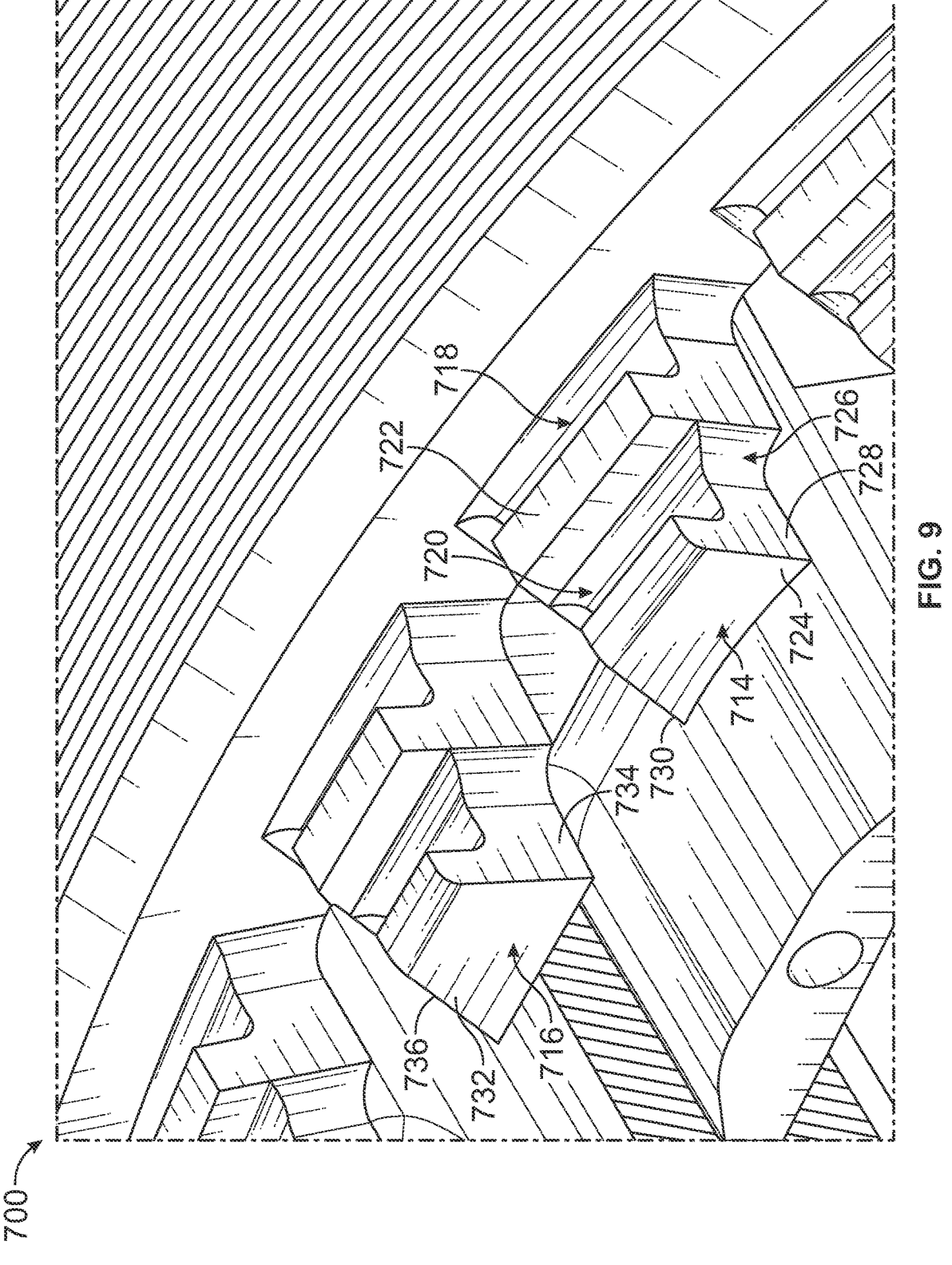
FIG. 9 illustrates an enlarged partial view of the stator of FIG. 7, according to an example implementation.

FIG. 7 illustrates a perspective view of a stator 700 with asymmetric posts, FIG. 8 illustrates a front view of the stator 700, and FIG. 9 illustrates an enlarged partial view of the stator 700, according to an example implementation. As shown, at least some of the posts of the stator 700 have an asymmetric trapezoidal shape.

For example, referring to FIG. 8, the stator 700 has a post 702 having a distal wall 703 shaped as a trapezium. The distal wall 703 has a first side 704 and a second side 706. A taper angle of the first side 704 is different from a respective taper angle of the second side 706, rendering the post 702 shaped as an asymmetric trapezium.

As depicted, several other posts of the stator 700 are similar and have respective distal walls shaped as asymmetric trapezium. However, in examples, some of the posts can have distal walls shaped as symmetric trapeziums, such as post 708.

Further, adjacent posts of the stator 700 are different from each other and have different taper angles. For example, the taper angles of respective sides of a distal wall 709 of post 710 are different from the taper angles of the sides 704, 706 of the post 702, which is adjacent the post 710.

As shown in FIG. 8, the stator 700 is generally circular, and thus defines four quadrants that are labelled in FIG. 8. Each quadrant has a respective set of posts. In one example, a pattern of the posts can be repeated or the posts in one quadrant can be a mirror image (or a reflection about a point) of respective posts in another quadrant. For example, as depicted in FIG. 8, a set of posts of the third quadrant are a reflection of a respective set of posts of the first quadrant around a center point 712 (disposed along a longitudinal axis of the stator 700). For instance, a post 711 of the third quadrant is a mirror image around the center point 712 of the post 708.

Similarly, a set of posts of the fourth quadrant are a reflection of a respective set of posts of the second quadrant around the center point 712. For instance, a post 713 of the fourth quadrant is a mirror image around the center point 712 of the post 702.

FIG. 9 depicts an enlarged view (zoomed-in view) of the stator 700, illustrating a post 714 and a post 716 that are adjacent to each other. The post 714 has a first slot 718 and a second slot 720 separated by a partition wall 722. The posts 714 also has a distal wall 724 such that the second slot 720 is formed as a depression or groove between the partition wall 722 and the distal wall 724.

As shown, the distal wall 724 is shaped as a trapezium. Particularly, the distal wall 724 has a first side 728 tapered at a first angle and a second side 730 tapered at a second angle. The first angle may be different from the second angle such that the distal wall 724 is shaped as an asymmetric trapezium.

In an example, the partition wall 722 is shaped generally as a rectangular prism. In another example, the partition wall 722 is formed as a trapezium that has sides with taper angles similar to those of the distal wall 724.

Further, a step 726 (e.g., a lateral step similar to the step 410 described above with respect to FIG. 4) is formed at a transition between the first slot 718 to the second slot 720 (or at the transition from the partition wall 722 to the second slot 720). The step 726 can be a sharp step or a filleted/curved step as depicted in FIG. 9. As mentioned above with respect to the step 410, the step 726 creates room or a landing spot for a jumper wire to enter the upper level (e.g., the first slot 718 or the second slot 720). Without the step 726, the jumper wire might slip to the lower level when automatically wounding the jumper wire around the stator 700.

The post 716 can be configured generally similar to the post 714. Particularly, the post 716 has a distal wall 732 with a first side 734 and a second side 736. Taper angles of the sides 734, 736 could be different from respective taper angles of the sides 728, 730.

The posts being shaped as trapeziums (with non-parallel sides) may facilitate molding the posts. In particular, four core pulls might be used to form the posts, one pull for each quadrant, for example. For instance, a die can be pulled radially outward to create the slots and features of posts in a given quadrant in one pull. Thus, having non-parallel sides or edges can simplify the molding process.

In examples, the posts (e.g., the posts 106, 604) additionally support and facilitate mounting a stator cover that can be mounted to the stator 100.

Figure 10:
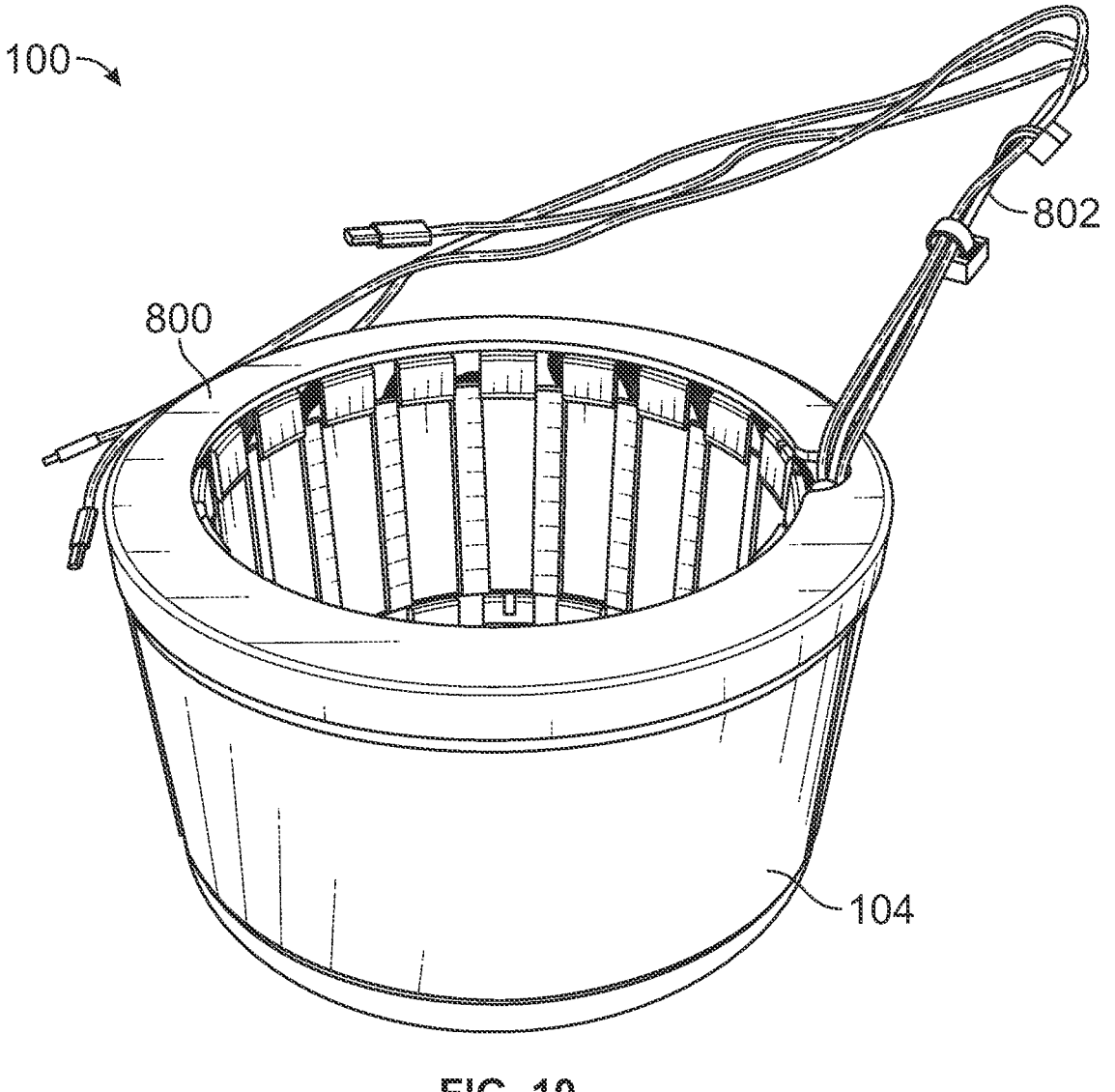
FIG. 10 illustrates a perspective view of the stator of FIGS. 2A-2B with a stator cover mounted thereto, according to an example implementation.

FIG. 10 illustrates a perspective view of the stator 100 with a stator cover 800 mounted thereto, according to an example implementation. As shown the stator cover 800 is mounted to the posts of the stator body 104. The stator cover 800 prevents high voltage wires of the wire windings and the jumper wires from contacting a motor housing when the stator 100 is placed with in the motor housing. Further, the stator cover 800 has a hole from which jumper wires or jumper cable 802 are routed after circulating through the outward and inner circular channels described above.

FIG. 11 is a flowchart of a method 900 for making or assembling a stator of an electric motor, according to an example implementation. The method 900 can be used to make the stator 100 or the stator 700. At least some of the operations of the method 900 can be performed automatically, e.g., via a machine or robot.

The method 900 may include one or more operations, or actions as illustrated by one or more of blocks 902-906. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 902, the method 900 includes providing a stator body (e.g., the stator body 104) of stator (e.g., the stator 100 or the stator 700) of an electric motor, wherein the stator body 104 is generally cylindrical. The term "providing" as used herein, and for example with regard to the segment of the stator body 104 or other components includes any action to make the stator body 104 or any other component available for use, such as supplying the stator body 104 or bringing the stator body 104 to an apparatus or to a work environment for further processing (e.g., injection molding of the posts, mounting other components, winding or routing a winding wire or a jumper wire, etc.).

At block 904, the method 900 includes forming a plurality of posts in a circular array about a perimeter of the stator body 104 such that the plurality of posts protrude axially from the stator body 104, wherein a post (e.g., the post 106, 604, 702, 708, 710, 711, 713, 714, 716) of the plurality of posts includes: (i) a first slot (e.g., the first slot 400, 718), (ii) a second slot (e.g., the second slot 402, 720) that is disposed outward from the first slot, and (iii) a partition wall (e.g., the partition wall 404, 722) that separates the first slot from the second slot, wherein respective first slots of the plurality of posts are aligned circularly to form an inward circular channel (e.g., inward circular channel 508) the about an outer peripheral surface of the stator body 104, wherein respective second slots of the plurality of posts of the stator body 104 are aligned circularly to form an outward circular channel (e.g., outward circular channel 502) about the outer peripheral surface of the stator body 104, such that the outward circular channel is shifted outward from and is parallel to the inward circular channel, wherein the outward circular channel is insulated from the inward circular channel via respective partition walls of the plurality of posts.

At block 906, the method 900 includes routing three jumper wires (e.g., the jumper wires 500, 504, 506) through the outward circular channel and the inward circular channel such that each jumper wire of the three jumper wires traverses at least a portion of the outward circular channel or the inward circular channel without contacting any other jumper wire.

The method 900 can further include other steps associated with making the stator 100, 700 described throughout herein. For example, routing three jumper wires can include disposing a first jumper wire (e.g., the first jumper wire 500) in a portion of the outward circular channel, disposing a second jumper wire (e.g., the second jumper wire 504) in a respective portion of the inward circular channel, thereby insulting the first jumper wire from the second jumper wire; and disposing a third jumper wire (e.g., the jumper wire 600) partially in the outward circular channel and partially in the inward circular channel without contacting either the first jumper wire or the second jumper wire.

In this example, disposing the third jumper wire partially in the outward circular channel and partially in the inward circular channel can include: routing the third jumper wire through a portion of the outward circular channel; routing the third jumper wire through a lower level underneath one or more posts of the plurality of posts; and twisting the third jumper wire to route the third jumper wire to an upper level to be disposed through the inward circular channel without contacting the first jumper wire or the second jumper wire.

In an example, a width of the first slot is greater than a respective width of the second slot such that a step formed at a transition from the partition wall to the second slot due to a difference in width between the first slot and the second slot. In this example, twisting the third jumper wire to route the third jumper wire to the upper level can include routing the third jumper wire through the step as the third jumper wire is twisted to the upper level.

In another example, forming the plurality of posts includes: forming at least one post of the plurality of posts to have a distal wall such that the second slot of the at least one post is defined between the distal wall and the partition wall, wherein the distal wall is shaped as a trapezium. The method 900 can include any of the other operations described herein.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to those with skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiments (EEEs) listed below.

EEE 1 is a stator of an electric motor, the stator comprising: a stator body that is generally cylindrical; and a plurality of posts that protrude axially from the stator body and are arranged in a circular array about a perimeter of the stator body, wherein a post of the plurality of posts includes: a first slot, a second slot that is disposed outward from the first slot, and a partition wall that separates the first slot from the second slot, wherein respective first slots of the plurality of posts are aligned circularly to form an inward circular channel about an outer peripheral surface of the stator body, wherein respective second slots of the plurality of posts of the stator body are aligned circularly to form an outward circular channel about the outer peripheral surface of the stator body, such that the outward circular channel is shifted outward from and is parallel to the inward circular channel, wherein the outward circular channel is insulated from the inward circular channel via respective partition walls of the plurality of posts, and wherein the outward circular channel and the inward circular channel accommodate three jumper wires such that each jumper wire of the three jumper wires traverses at least a portion of the outward circular channel or the inward circular channel without contacting any other jumper wire.

EEE 2 is the stator of EEE 1, wherein the three jumper wires comprise: a first jumper wire disposed in a portion of the outward circular channel; a second jumper wire disposed in a respective portion of the inward circular channel, thereby insulting the first jumper wire from the second jumper wire; and a third jumper wire that is disposed partially in the outward circular channel and partially in the inward circular channel without contacting either the first jumper wire or the second jumper wire.

EEE 3 is the stator of EEE 2, wherein the third jumper wire is routed through a portion of the outward circular channel, then through a lower level underneath one or more posts of the plurality of posts, then to an upper level to be disposed through the inward circular channel without contacting the first jumper wire or the second jumper wire.

EEE 4 is the stator of any of EEEs 1-3, wherein a width of the first slot is greater than a respective width of the second slot.

EEE 5 is the stator of EEE 4, wherein the post further comprises: a step formed at a transition from the partition wall to the second slot due to a difference in width between the first slot and the second slot.

EEE 6 is the stator of EEE 5, wherein at least one jumper wire of the three jumper wires is routed through a portion of the outward circular channel, then through a lower level underneath one or more posts of the plurality of posts, then accommodated through the step to an upper level to be disposed through the inward circular channel.

EEE 7 is the stator of any of EEEs 1-6, wherein the post further comprises: a distal wall, wherein the second slot is defined between the distal wall and the partition wall.

EEE 8 is the stator of EEE 7, wherein the distal wall is rectangular.

EEE 9 is the stator of EEE 7, wherein the distal wall is shaped as a trapezium.

EEE 10 is the stator of EEE 9, wherein the distal wall is shaped as an asymmetric trapezium such that a first side of the trapezium is tapered at a first angle, wherein a second side of the trapezium is tapered at a second angle that is different from the first angle.

EEE 11 is the stator of EEE 10, wherein the post is a first post, and wherein a respective distal wall of a second post, adjacent to the first post, is shaped as a respective asymmetric trapezium, wherein a respective first angle of taper of the respective distal wall is different from the first angle of the first post, and wherein a respective second angle of taper of the respective distal wall is different from the second angle of the first post.

EEE 12 is the stator of any of EEEs 1-11, wherein the stator includes four quadrants, wherein each quadrant has a respective set of posts.

EEE 13 is the stator of EEE 12, wherein a set of posts in a third quadrant of the four quadrants are a reflection of a respective set of posts of a first quadrant of the four quadrants around a center point of the stator body.

EEE 14 is the stator of any of EEEs 12-13, wherein a set of posts in a fourth quadrant of the four quadrants are a reflection of a respective set of posts of a second quadrant of the four quadrants around a center point of the stator body.

EEE 15 is the stator of any of EEEs 1-14, further comprising: a stator cover mounted to the plurality of posts of the stator body such that the stator cover prevents a first jumper wire and a second jumper wire from contacting a motor housing when the stator is placed with in the motor housing.

EEE 16 is a method for making or assembling the stator of any of EEEs 1-15. For example, the method includes: providing a stator body of stator of an electric motor, wherein the stator body is generally cylindrical; forming a plurality of posts in a circular array about a perimeter of the stator body such that the plurality of posts protrude axially from the stator body, wherein a post of the plurality of posts includes: (i) a first slot, (ii) a second slot that is disposed outward from the first slot, and (iii) a partition wall that separates the first slot from the second slot, wherein respective first slots of the plurality of posts are aligned circularly to form an inward circular channel about an outer peripheral surface of the stator body, wherein respective second slots of the plurality of posts of the stator body are aligned circularly to form an outward circular channel about the outer peripheral surface of the stator body, such that the outward circular channel is shifted outward from and is parallel to the inward circular channel, wherein the outward circular channel is insulated from the inward circular channel via respective partition walls of the plurality of posts; and routing three jumper wires through the outward circular channel and the inward circular channel such that each jumper wire of the three jumper wires traverses at least a portion of the outward circular channel or the inward circular channel without contacting any other jumper wire.

EEE 17 is the method of EEE 16, wherein routing three jumper wires comprises: disposing a first jumper wire in a portion of the outward circular channel; disposing a second jumper wire in a respective portion of the inward circular channel, thereby insulting the first jumper wire from the second jumper wire; and disposing a third jumper wire partially in the outward circular channel and partially in the inward circular channel without contacting either the first jumper wire or the second jumper wire.

EEE 18 is the method of EEE 17, wherein disposing the third jumper wire partially in the outward circular channel and partially in the inward circular channel comprises: routing the third jumper wire through a portion of the outward circular channel; routing the third jumper wire through a lower level underneath one or more posts of the plurality of posts; and twisting the third jumper wire to route the third jumper wire to an upper level to be disposed through the inward circular channel without contacting the first jumper wire or the second jumper wire.

EEE 19 is the method of EEE 18, wherein a width of the first slot is greater than a respective width of the second slot such that a step formed at a transition from the partition wall to the second slot due to a difference in width between the first slot and the second slot, wherein twisting the third jumper wire to route the third jumper wire to the upper level comprises: routing the third jumper wire through the step as the third jumper wire is twisted to the upper level.

EEE 20 is the method of any of EEEs 18-19, wherein forming the plurality of posts comprises: forming at least one post of the plurality of posts to have a distal wall such that the second slot of the at least one post is defined between the distal wall and the partition wall, wherein the distal wall is shaped as a trapezium.

What is claimed is:

1. A stator of an electric motor, the stator comprising:
a stator body that is generally cylindrical; and
a plurality of posts that protrude axially from the stator body and are arranged in a circular array about a perimeter of the stator body, wherein a post of the plurality of posts includes:
a first slot,
a second slot that is disposed outward from the first slot, and
a partition wall that separates the first slot from the second slot,
wherein respective first slots of the plurality of posts are aligned circularly to form an inward circular channel about an outer peripheral surface of the stator body, wherein respective second slots of the plurality of posts of the stator body are aligned circularly to form an outward circular channel about the outer peripheral surface of the stator body, such that the outward circular channel is shifted outward from and is parallel to the inward circular channel, wherein the outward circular channel is insulated from the inward circular channel via respective partition walls of the plurality of posts, and
wherein the outward circular channel and the inward circular channel accommodate three jumper wires such that each jumper wire of the three jumper wires traverses at least a portion of the outward circular channel or the inward circular channel without contacting any other jumper wire.

2. The stator of claim 1, wherein the three jumper wires comprise:
a first jumper wire disposed in a portion of the outward circular channel;
a second jumper wire disposed in a respective portion of the inward circular channel, thereby insulting the first jumper wire from the second jumper wire; and
a third jumper wire that is disposed partially in the outward circular channel and partially in the inward circular channel without contacting either the first jumper wire or the second jumper wire.

3. The stator of claim 2, wherein the third jumper wire is routed through a portion of the outward circular channel, then through a lower level underneath one or more posts of the plurality of posts, then to an upper level to be disposed through the inward circular channel without contacting the first jumper wire or the second jumper wire.

4. The stator of claim 1, wherein a width of the first slot is greater than a respective width of the second slot.

5. The stator of claim 4, wherein the post further comprises:
a step formed at a transition from the partition wall to the second slot due to a difference in width between the first slot and the second slot.

6. The stator of claim 5, wherein at least one jumper wire of the three jumper wires is routed through a portion of the outward circular channel, then through a lower level underneath one or more posts of the plurality of posts, then accommodated through the step to an upper level to be disposed through the inward circular channel.

7. The stator of claim 1, wherein the post further comprises:
a distal wall, wherein the second slot is defined between the distal wall and the partition wall.

8. The stator of claim 7, wherein the distal wall is rectangular.

9. The stator of claim 7, wherein the distal wall is shaped as a trapezium.

10. The stator of claim 9, wherein the distal wall is shaped as an asymmetric trapezium such that a first side of the trapezium is tapered at a first angle, wherein a second side of the trapezium is tapered at a second angle that is different from the first angle.

11. The stator of claim 10, wherein the post is a first post, and wherein a respective distal wall of a second post, adjacent to the first post, is shaped as a respective asymmetric trapezium, wherein a respective first angle of taper of the respective distal wall is different from the first angle of the first post, and wherein a respective second angle of taper of the respective distal wall is different from the second angle of the first post.

12. The stator of claim 1, wherein the stator includes four quadrants, wherein each quadrant has a respective set of posts.

13. The stator of claim 12, wherein a set of posts in a third quadrant of the four quadrants are a reflection of a respective set of posts of a first quadrant of the four quadrants around a center point of the stator body.

14. The stator of claim 12, wherein a set of posts in a fourth quadrant of the four quadrants are a reflection of a respective set of posts of a second quadrant of the four quadrants around a center point of the stator body.

15. The stator of claim 1, further comprising:
a stator cover mounted to the plurality of posts of the stator body such that the stator cover prevents a first jumper wire and a second jumper wire from contacting a motor housing when the stator is placed with in the motor housing.

16. A method comprising:
providing a stator body of stator of an electric motor, wherein the stator body is generally cylindrical;
forming a plurality of posts in a circular array about a perimeter of the stator body such that the plurality of posts protrude axially from the stator body, wherein a post of the plurality of posts includes: (i) a first slot, (ii) a second slot that is disposed outward from the first slot, and (iii) a partition wall that separates the first slot from the second slot, wherein respective first slots of the plurality of posts are aligned circularly to form an inward circular channel about an outer peripheral surface of the stator body, wherein respective second slots of the plurality of posts of the stator body are aligned circularly to form an outward circular channel about the outer peripheral surface of the stator body, such that the outward circular channel is shifted outward from and is parallel to the inward circular channel, wherein the outward circular channel is insulated from the inward circular channel via respective partition walls of the plurality of posts; and
routing three jumper wires through the outward circular channel and the inward circular channel such that each jumper wire of the three jumper wires traverses at least a portion of the outward circular channel or the inward circular channel without contacting any other jumper wire.

17. The method of claim 16, wherein routing three jumper wires comprises:

disposing a first jumper wire in a portion of the outward circular channel;

disposing a second jumper wire in a respective portion of the inward circular channel, thereby insulting the first jumper wire from the second jumper wire; and disposing a third jumper wire partially in the outward circular channel and partially in the inward circular channel without contacting either the first jumper wire or the second jumper wire.

18. The method of claim 17, wherein disposing the third jumper wire partially in the outward circular channel and partially in the inward circular channel comprises:

routing the third jumper wire through a portion of the outward circular channel;

routing the third jumper wire through a lower level underneath one or more posts of the plurality of posts; and twisting the third jumper wire to route the third jumper wire to an upper level to be disposed through the inward circular channel without contacting the first jumper wire or the second jumper wire.

19. The method of claim 18, wherein a width of the first slot is greater than a respective width of the second slot such that a step formed at a transition from the partition wall to the second slot due to a difference in width between the first slot and the second slot, wherein twisting the third jumper wire to route the third jumper wire to the upper level comprises:

routing the third jumper wire through the step as the third jumper wire is twisted to the upper level.

20. The method of claim 18, wherein forming the plurality of posts comprises:

forming at least one post of the plurality of posts to have a distal wall such that the second slot of the at least one post is defined between the distal wall and the partition wall, wherein the distal wall is shaped as a trapezium.

*    *    *    *    *